US012792813B2

(12) United States Patent
Khattel et al.

(10) Patent No.: US 12,792,813 B2
(45) Date of Patent: Nov. 10, 2026

(54) MACHINE LEARNING BASED PROCESSING OF DESIGN FILES FOR ELECTRONICS HARDWARE DESIGN

(71) Applicant: CELUS GmbH, Munich (DE)

(72) Inventors: Wajdi Khattel, Munich (DE); André Pesco Alcalde, Munich (DE); Alexander Pohl, Heldenstein (DE)

(73) Assignee: Celus GmbH, Munich (DE)

( * ) Notice: Subject to any disclaimer, the term of this patent is extended or adjusted under 35 U.S.C. 154(b) by 788 days.

(21) Appl. No.: 18/301,139

(22) Filed: Apr. 14, 2023

(65) Prior Publication Data

US 2023/0342534 A1 Oct. 26, 2023

Related U.S. Application Data

(60) Provisional application No. 63/371,500, filed on Aug. 15, 2022, provisional application No. 63/363,416, filed on Apr. 22, 2022.

(51) Int. Cl.

*G06F 30/392* (2020.01)
*G06F 3/0486* (2013.01)
*G06F 119/18* (2020.01)

(52) U.S. Cl.

CPC .......... *G06F 30/392* (2020.01); *G06F 3/0486* (2013.01); *G06F 2119/18* (2020.01)

(58) Field of Classification Search

USPC .......................................................... 716/119
See application file for complete search history.

(56) References Cited

U.S. PATENT DOCUMENTS

| | | | | |
|---|---|---|---|---|
| 9,268,895 | B2 | 2/2016 | Perry et al. | |
| 9,990,455 | B1 | 6/2018 | Sinivaara et al. | |
| 10,102,320 | B2 | 10/2018 | Pataky | |
| 10,289,788 | B1 | 5/2019 | Kumar et al. | |
| 10,437,954 | B1 | 10/2019 | White et al. | |
| 10,558,774 | B1 | 2/2020 | Kumar et al. | |
| 10,592,704 | B2 | 3/2020 | Brookshire | |
| 10,678,973 | B2 | 6/2020 | Chuang et al. | |
| 10,699,051 | B1 | 6/2020 | Zhang et al. | |
| 10,719,657 | B1 | 7/2020 | Feuillette | |
| 10,769,328 | B2 | 9/2020 | Chawda et al. | |
| 10,817,634 | B2 | 10/2020 | Oh | |
| 11,087,060 | B1 | 8/2021 | Zhang et al. | |
| 11,216,605 | B2 | 1/2022 | Osburn et al. | |
| 11,366,948 | B2 | 6/2022 | Srinivasan et al. | |
| 11,620,548 | B1 * | 4/2023 | Bhushan | G06N 20/00 706/12 |
| 11,775,720 | B2 | 10/2023 | Mahmud et al. | |
| 11,790,136 | B2 | 10/2023 | Park et al. | |
| 11,836,602 | B2 | 12/2023 | Li | |
| 11,836,641 | B2 | 12/2023 | Mamidi et al. | |

(Continued)

*Primary Examiner* — Mohammed Alam
(74) *Attorney, Agent, or Firm* — Knobbe, Martens, Olson & Bear, LLP

(57) ABSTRACT

System and methods are provided for using machine learning to automatically process, extract, and categorize design engineering files. The system receives a design file and extracts features from the design file, which can include nets. The system trains a machine learning model to receive the features as input and output probabilities for multiple ports for the nets. The predicted ports are presented in a graphical user interface and are used to engineer electronic hardware systems.

19 Claims, 12 Drawing Sheets

(56) References Cited

U.S. PATENT DOCUMENTS

| | | | |
|---|---|---|---|
| 11,900,033 | B2 | 2/2024 | Hunter et al. |
| 2021/0097220 | A1* | 4/2021 | Bhunia .................. G06F 30/27 |
| 2021/0319327 | A1 | 10/2021 | Poirier et al. |
| 2022/0027536 | A1 | 1/2022 | Dutta et al. |
| 2022/0180159 | A1 | 6/2022 | Kimura et al. |
| 2023/0153505 | A1 | 5/2023 | Chang et al. |
| 2023/0153512 | A1 | 5/2023 | Shapira et al. |
| 2023/0342534 | A1* | 10/2023 | Khattel ................ G06F 3/0486 |
| 2024/0126960 | A1 | 4/2024 | Peng et al. |

* cited by examiner

240

MACHINE LEARNING BASED PROCESSING OF DESIGN FILES FOR ELECTRONICS HARDWARE DESIGN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims benefit of U.S. Provisional Patent Application Ser. No. 63/363,416 entitled "MACHINE LEARNING BASED PROCESSING OF SCHEMATIC FILES FOR ELECTRONICS HARDWARE DESIGN" filed Apr. 22, 2022, and U.S. Provisional Patent Application Ser. No. 63/371,500, entitled "SYSTEMS AND METHODS FOR AUTOMATED ELECTRONICS DESIGN AND GRAPHICAL USER INTERFACE" filed Aug. 15, 2022, which are hereby incorporated by reference in their entireties.

BACKGROUND

Electronics engineering is a technical process to design and develop electronic equipment. The technical process includes designing electronic hardware systems based on electronic components. Each component can be represented by a system of elements using abstract symbols, which can be stored in schematic files. A schematic file can include a "network" or a "net," which is a collection of two or more interconnected subcomponents. A group of nets from a schematic file can be a port. Some schematic files can have thousands of nets. Engineers must know the ports of electronic components to design electronic systems.

SUMMARY

The systems, methods, and devices described herein each have several aspects, no single one of which is solely responsible for its desirable attributes. Without limiting the scope of this disclosure, several non-limiting features will now be discussed briefly.

According to an embodiment, a computer-implemented method is disclosed comprising: receiving, via a first graphical user interface, a design file including at least a plurality of nets; generating, from the design file, a converted design file; determining a feature vector based on the converted design file; applying a machine learning model, wherein input to the machine learning model includes at least the feature vector, wherein output of the machine learning model includes at least a plurality of ports, wherein each port of the plurality of ports is associated with a subset of the plurality of nets; storing, in a data storage medium, the plurality of ports; and causing presentation, in a second graphical user interface, of at least a first port from the plurality of ports.

In another embodiment, a first data format of the design file may be different than a second data format of the converted design file.

In another embodiment, generating the converted design file may include outputting the converted design file in the second data format.

According to another embodiment, a computer-implemented method is disclosed comprising: receiving a design file including at least a plurality of nets; determining a feature vector based on the design file; applying a first machine learning model, wherein input to the first machine learning model includes at least the feature vector, wherein output of the first machine learning model includes at least a plurality of ports, wherein each port of the plurality of ports is associated with a subset of the plurality of nets; storing, in a data storage medium, the plurality of ports; and causing presentation, in a second graphical user interface, of at least a first port from the plurality of ports.

In another embodiment, the computer-implemented method may further comprise: receiving, via the second graphical user interface, a user selection of the first data object; adding the first data object to a data model representing a circuit, wherein the first data object is connected to a second data object in the data model and the first port of the first data object is compatible with a second port of the second data object; and causing presentation, in the second graphical user interface, of a block diagram corresponding to the data model.

In another embodiment, the computer-implemented method may further comprise: receiving, via the second graphical user interface, a user selection of the first data object; adding the first data object to a data model, wherein the first data object is connected to a second data object in the data model and the first port of the first data object is compatible with a second port of the second data object; and causing presentation, in the second graphical user interface, of a block diagram corresponding to the data model.

In another embodiment, the computer-implemented method may further comprise: receiving, via the second graphical user interface, user input associated with the first port; generating a modified first port based at least in part on the user input; and storing, in the data storage medium, the modified first port.

In another embodiment, the computer-implemented method may further comprise: generating an updated training data set based on the modified first port, wherein generating the updated training set further includes at least: adding a label associated with the modified first port to a training data set; and training a second machine learning model based on the updated training data set.

According to an embodiment, a system is disclosed comprising: a data storage medium; and one or more computer hardware processors in communication with the data storage medium, wherein the one or more computer hardware processors are configured to execute computer-executable instructions to at least: receive a design file including at least a plurality of nets; determine a feature vector based on the design file; apply a machine learning model, wherein input to the machine learning model includes at least the feature vector, wherein output of the machine learning model includes at least a plurality of ports, wherein each port of the plurality of ports is associated with a subset of the plurality of nets; store, in the data storage medium, the plurality of ports; and cause presentation, in a second graphical user interface, of at least a first port from the plurality of ports.

In another embodiment, the one or more computer hardware processors may be further configured to: generate, from the design file, a converted design file.

In another embodiment, a first data format of the design file may be different than a second data format of the converted design file.

In another embodiment, generating the converted design file may include outputting the converted design file in the second data format.

In another embodiment, storing the plurality of ports may comprise: generating a first data object including at least the first port; and storing, in the data storage medium, the first data object.

In another embodiment, the one or more computer hardware processors may be further configured to: receive, via the second graphical user interface, a user selection of the first data object; and add the first data object to a data model, wherein the first data object is connected to a second data object in the data model and the first port of the first data object is compatible with a second port of the second data object.

In another embodiment, the data model may represent a circuit.

In another embodiment, the data model may represent an electronic hardware system.

In another embodiment, the one or more computer hardware processors may be further configured to: receive, via the second graphical user interface, user input associated with the first port; generate a modified first port based at least in part on the user input; and store, in the data storage medium, the modified first port.

In another embodiment, the one or more computer hardware processors may be further configured to: generate an updated training data set based on the modified first port, wherein generating the updated training set further includes at least: adding a label associated with the modified first port to a training data set; and train a second machine learning model based on the updated training data set.

In another embodiment, the machine learning model may correspond to at least one of a random forest model, a gradient boosted decision tree model, a support vector machine, or a neural network.

In another embodiment, determining the feature vector may further include at least: determining a plurality of features based on a first net in the design file, wherein the plurality of features includes at least: (i) a first feature for a name of the first net, (ii) a second feature based on the name of the first net, (iii) a third feature for a type of the first net, (iv) a fourth feature indicating a same type for the first net and a second net in the design file, (v) a fifth feature for a connection between the first net and a first component or a first pin, (vi) a sixth feature based on a name of a pin connected to the first net, (vii) a seventh feature indicating a number of connections between the first net and a second component or a second pin, and/or (viii) an eighth feature for a connection between the first net and another net through a third component.

In another embodiment, determining the feature vector may further include at least: determining a plurality of features based on a first net in the design file, wherein the plurality of features includes at least: (i) a first feature for a name of the first net, (ii) a second feature based on the name of the first net, (iii) a third feature indicating a same type for the first net and a second net in the design file, (iv) a fourth feature for a connection between the first net and a first component or a first pin, and (v) a fifth feature based on a name of a pin connected to the first net.

In another embodiment, determining the feature vector may further include at least: determining a plurality of features based on a first net in the design file, wherein a first feature of the plurality of features includes at least: (i) a name of the first net, (ii) a connection between the first net and another net, (iii) a connection between the first net and a Voltage at a Common Collector (VCC) net, (iv) a connection between the first net and a ground (GND) net, (v) a connection between the first net and a power supply, (vi) a connection between the first net and a power supply via a resistor or capacitor, and/or (vii) a number of resistors or capacitors connected to the first net.

In another embodiment, determining the feature vector may further include at least: determining a plurality of features based on a first net in the design file, wherein the plurality of features includes at least: (i) a name of the first net, and (ii) a connection between the first net and another net.

In another embodiment, the label may correspond to a port type for the modified first port.

In another embodiment, each port of the plurality of ports may be associated with a port type.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Figure 1:
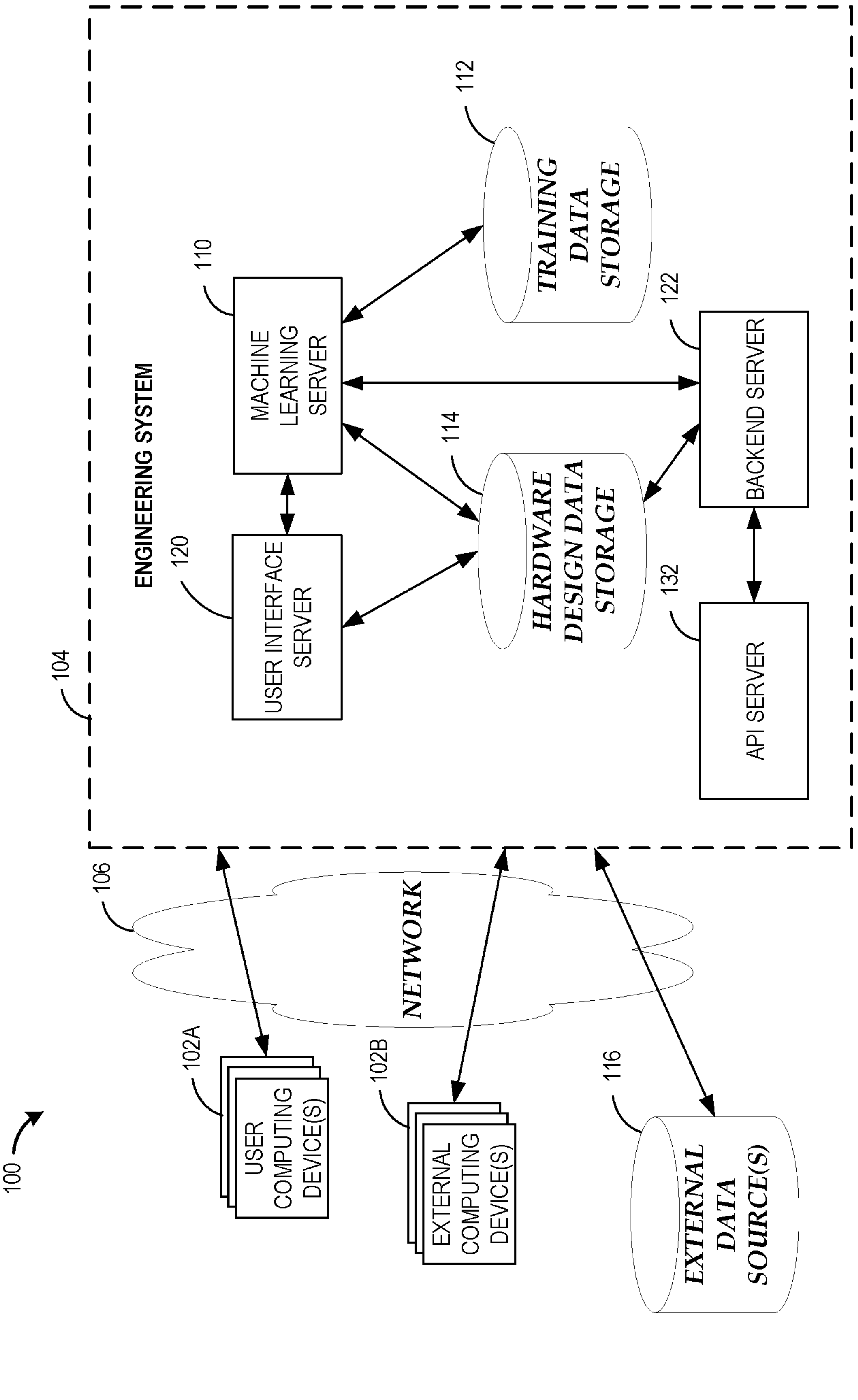
FIG. 1 is a block diagram depicting an illustrative network environment for implementing an engineering system.

As described above, the design of electronic systems is a technical engineering process. In particular, the development of design files is usually performed through the usage of computers and appropriate Engineering Design Automation (EDA) software tools, where the engineer can manually create drawings that represent logically the electronic systems, commonly referred to as "schematics" or "schematic files," and mechanical drawings of the physical implementation of such systems, commonly referred to as a "layout" of the design. The designing of electronic systems typically involves reusing components that can be connected together based on compatible ports or interfaces. With some existing EDA software tools, the engineer manually determines and specifies the ports of components when designing an electronic system. This manual process for defining ports can be a time-consuming, laborious, and error-prone process.

Generally described, aspects of the present disclosure are directed to improved systems and methods that use machine learning to automatically process, extract, and categorize aspects of design files, such as schematic files and/or a netlist. The system can receive user-provided design files via a user interface. The system can receive user-provided design files via an application programming interface. The system can convert the design files from proprietary data formats to a common data format. The system can further extract features from the converted design files and represent the features as an input vector or other input. The system applies the input to a previously trained machine-learning model to receive predicted data as output, such as predicted ports and/or probabilities from the input data. The predicted data, such as ports, can be presented to the user in another user interface. A user can manually edit or create new design data, such as editing or creating ports. The system can use the user-provided design data to train an improved machine learning model.

The systems and methods described herein may improve automated electronics design and machine learning technology. Predicting ports from design data via machine learning can be a technically challenging problem. The solutions described herein may address the technical challenges of automatically predicting ports via the machine learning solutions described herein, such as, but not limited to, the particular machine learning features, combinations of features, and/or configurations of machine learning models described herein. Thus, the systems and methods described herein can improve over traditional machine learning techniques.

Instead of using machine learning algorithms to address electronic hardware design issues, some existing systems can rely on exclusively manual data creation. For example, a user can manually specify each port for every component in an electronic components database and/or for a particular electronics system design. Since such systems rely on substantial human involvement for mapping and categorizing electronic components, the set of electronic components available to the engineers may be limited. Moreover, as described above, such manual creation of electronics hardware design data can be time consuming, impractical for a large number of components, error prone, and/or inefficient.

The systems and methods described herein may improve electronics design engineering technology. The solutions described herein may address the technical challenges of categorizing large amounts of electronics hardware data. For example, a design file, such as a schematic file and/or a netlist, may contain thousands of nets and may be thousands of lines long. In many cases, it is simply impractical for a human to analyze the entire contents of a design file and identify the ports associated with the design file. Moreover, design files can come in many different proprietary data formats, which can be impractical for a human to be familiar with the different formats of design files. Therefore, the technical solutions described herein can obviate or greatly reduce the need for manual creation of hardware design data. In particular, the data extraction and machine learning algorithms described herein can support multiple design data formats and can automatically and accurately categorize hardware design data. Thus, the systems and methods described herein can improve over traditional electronics design engineering techniques.

Turning to FIG. 1, an illustrative network environment 100 is shown in which an engineering system 104 may extract and predict data from design files. The network environment 100 may include one or more user computing devices 102A, one or more external computing devices 102B, an external data source 116, and the engineering system 104. The engineering system 104 may include an application programming interface (API) server 132, a backend server 122, a user interface server 120, a machine learning server 110, a training data storage 112, and a hardware design data storage 114. The constituents of the network environment 100 may be in communication with each other either locally or over a network 106.

The machine learning server 110 can be configured to execute a machine learning service. The machine learning service can train a machine learning model based on the training data. Thus, the machine learning server 110 can communicate with the training data storage 112 to receive the training data. The machine learning service can perform supervised machine learning and/or weak supervision. In some embodiments, the machine learning service trains a model based on one or more training data sets with labels. In some embodiments, the labels in the training data can be based on human annotations of training data. The trained machine learning model can receive data from a design file as input and output predicted data, such as ports. As described herein, user input (such as a user manually editing or creating hardware design data) can be received and stored in the hardware design data storage 114. Data from the hardware design data storage 114 can be incorporated into the training data sets. For example, if a user manually adds a port for an electronic component associated with schematics, then the user-added data can be incorporated into a training data set. The machine learning service can then train a new machine learning model based on updated training data.

Example user computing devices 102A can include a laptop, a tablet computer, and/or a personal computer. A user can submit, via the user computing device 102A and a user interface, one or more design files, such as a schematic file. The user interface server 120 can provide the user interface. Users, via the user computing device 102A, can further interact and/or create hardware design data via the user interface as described herein.

In some embodiments, an external computing device 102B can interact with the engineering system 104 via the API server 132. The external computing device 102B, via the API server 132 and an API, can provide one or more design files to the engineering system 104. The engineering system 104 can process the design file(s), as described herein. In some embodiments, the backend server 122 can execute a machine learning model that was trained by the machine learning server 110. In some embodiments, the engineering system 104 can receive hardware design data from an external data source 116. The hardware design data from the external data source 116 can be used for training purposes.

The training data storage 112 and/or the hardware design data storage 114 may be embodied in hard disk drives, solid state memories, any other type of non-transitory computer-readable storage medium. Each of the training data storage 112 and/or the hardware design data storage 114 may include a data store. As used herein, a "data store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage.

The network 106 may be any wired network, wireless network, or combination thereof. In addition, the network 106 may be a personal area network, local area network, wide area network, cable network, satellite network, cellular telephone network, or combination thereof. In addition, the network 106 may be a publicly accessible network of linked networks, possibly operated by various distinct parties, such as the Internet. In some embodiments, the network 106 may be a private or semi-private network, such as a corporate or university intranet. The network 106 can use protocols and components for communicating via the Internet or any of the other aforementioned types of networks, such as HTTP.

The engineering system 104 may be embodied in a plurality of devices. For example, the user interface server 120 and the machine learning server 110 may each include one or more of a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the user interface server 120 and the machine learning server 110. The memory generally includes RAM, ROM, and/or other persistent and/or auxiliary non-transitory computer-readable storage media.

FIGS. 2A, 2B, 2C, 2D, 2E, and 3 illustrate example user interfaces. In particular, FIGS. 2A, 2B, 2C, 2D, 2E, and 3 illustrate example user interfaces of the engineering system 104 described above with respect to FIG. 1. In various embodiments, aspects of the user interfaces may be rearranged from what is shown and described below, and/or particular aspects may or may not be included.

Figure 2A:
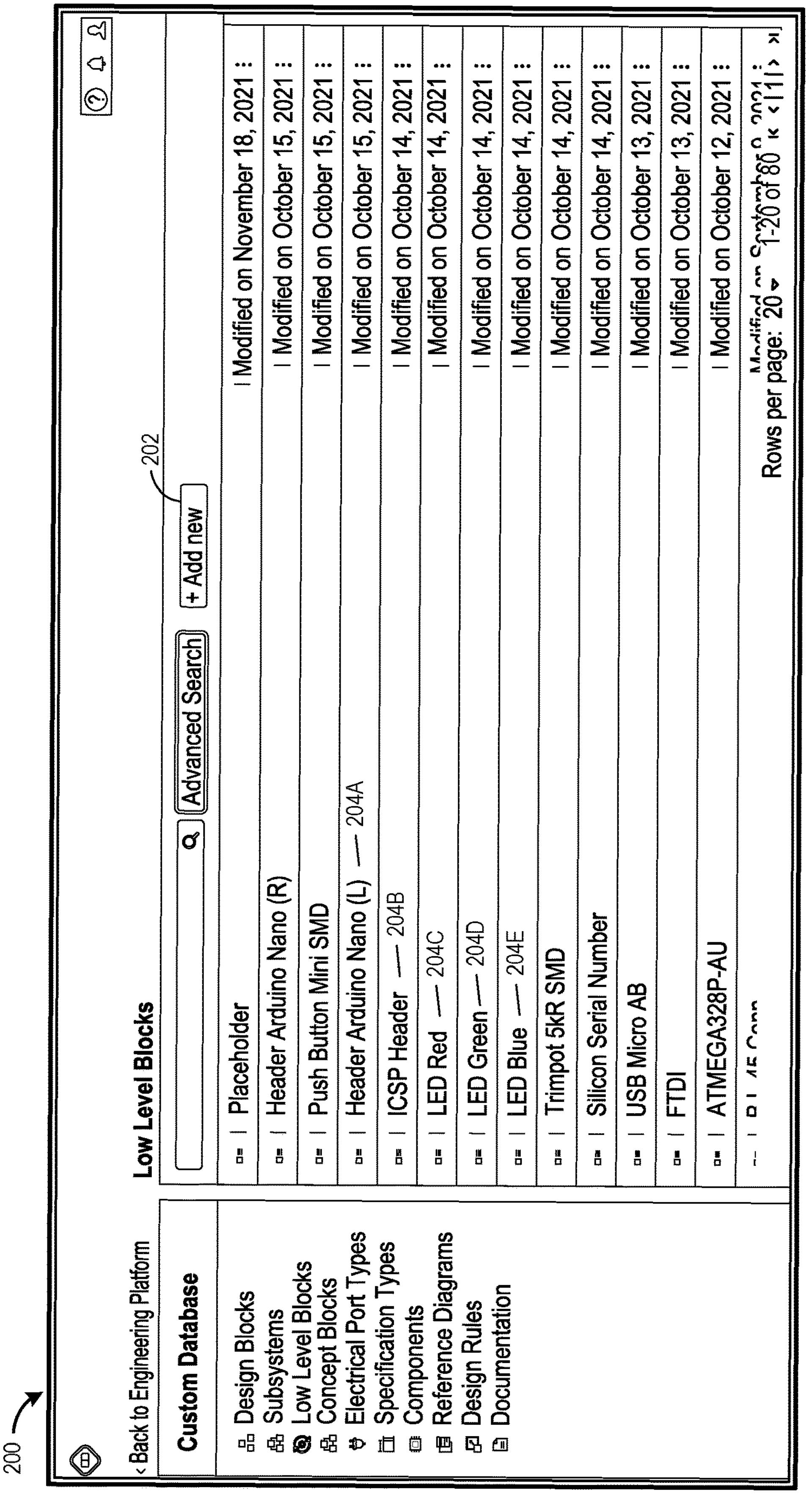
FIGS. 2A-2E depict example graphical user interfaces for uploading and processing design files.

FIG. 2A illustrates an example user interface 200 for adding and searching data objects. In the example user interface 200, a low-level data object may be referred to as a "block." The low-level data objects can correspond to the building block components of an electronics hardware system. Each of the list elements 204A, 204B, 204C, 204D, 204E in the user interface 200 can be associated with a respective low-level data object that can be used to describe an electronics hardware system. Each low-level data object can include a netlist (a list of the electronic components in a circuit and a list of the nodes they are connected to), in the form of schematics and a bill of materials (BOM), and a layout. As shown, example data objects can include a "Header Arduino Nano," an "ISCP Header," an "LED Red," an "LED Green," and an "LED Blue" data object. A user can select the add element 202 to create a new data object. A user can select a list element 204A, 204B, 204C, 204D, 204E to view or edit a respective data object.

Figure 2B:
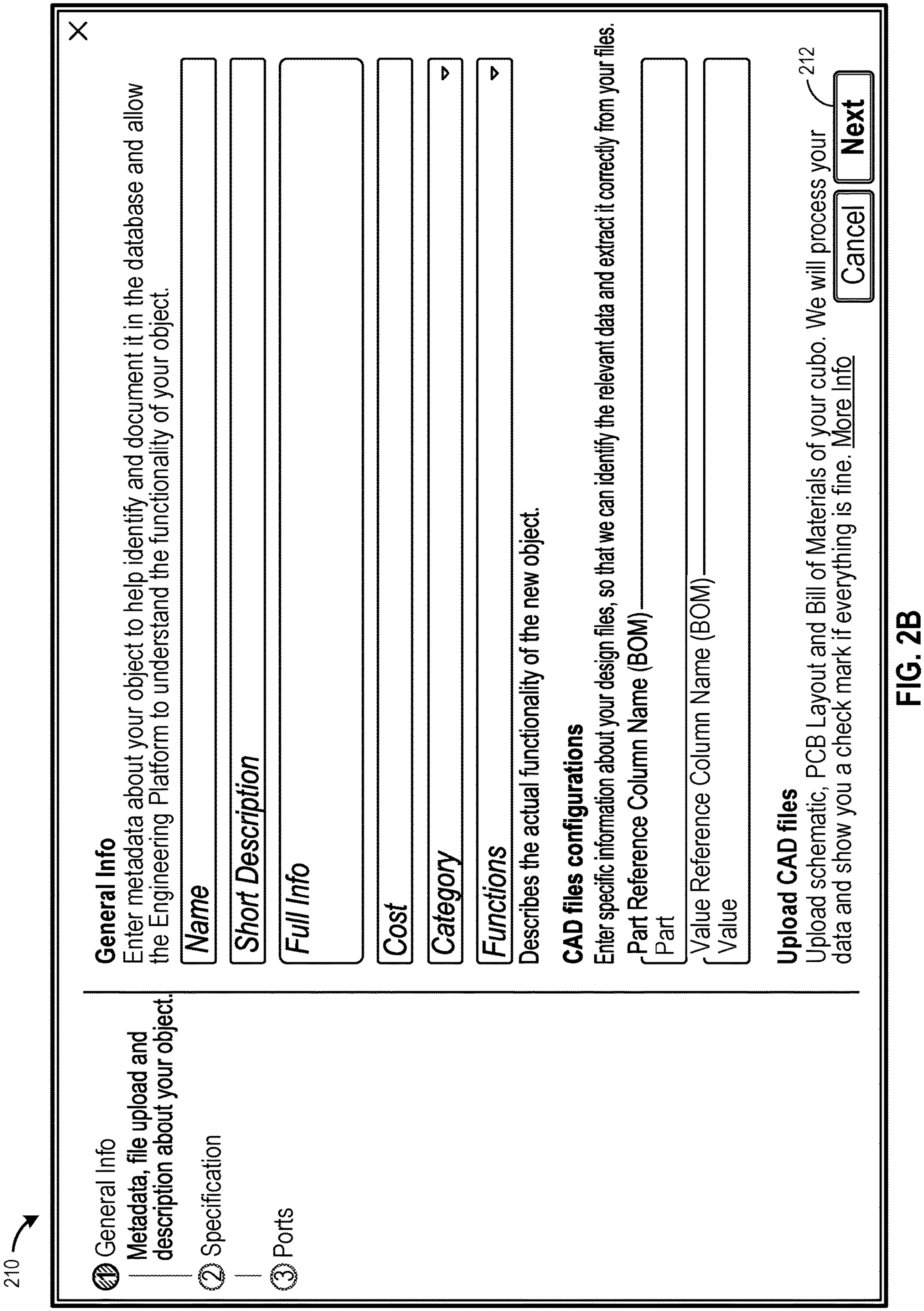

FIG. 2B illustrates an example user interface 210 for creating a data object. The example user interface 210 of FIG. 2B can be presented in response to a user selection of the add element 202 from the user interface 200 of FIG. 2A. A user can enter data for the data object, such as a name, a short description, a long description, a category (such as, but not limited to, a "module," a "microcontroller," or a "supply"), and functionality regarding the component. The user can enter metadata regarding the design files, such as the part reference column name (the name of the column in the BOM file that contains the information about reference designators) and the value reference column name (the name of the column in the BOM file that contains the information about component values) for a bill of materials. After the user has provided user input to the user interface 210, the user can select the next element 212 to proceed to the next step in the data object configuration process.

Figure 2C:
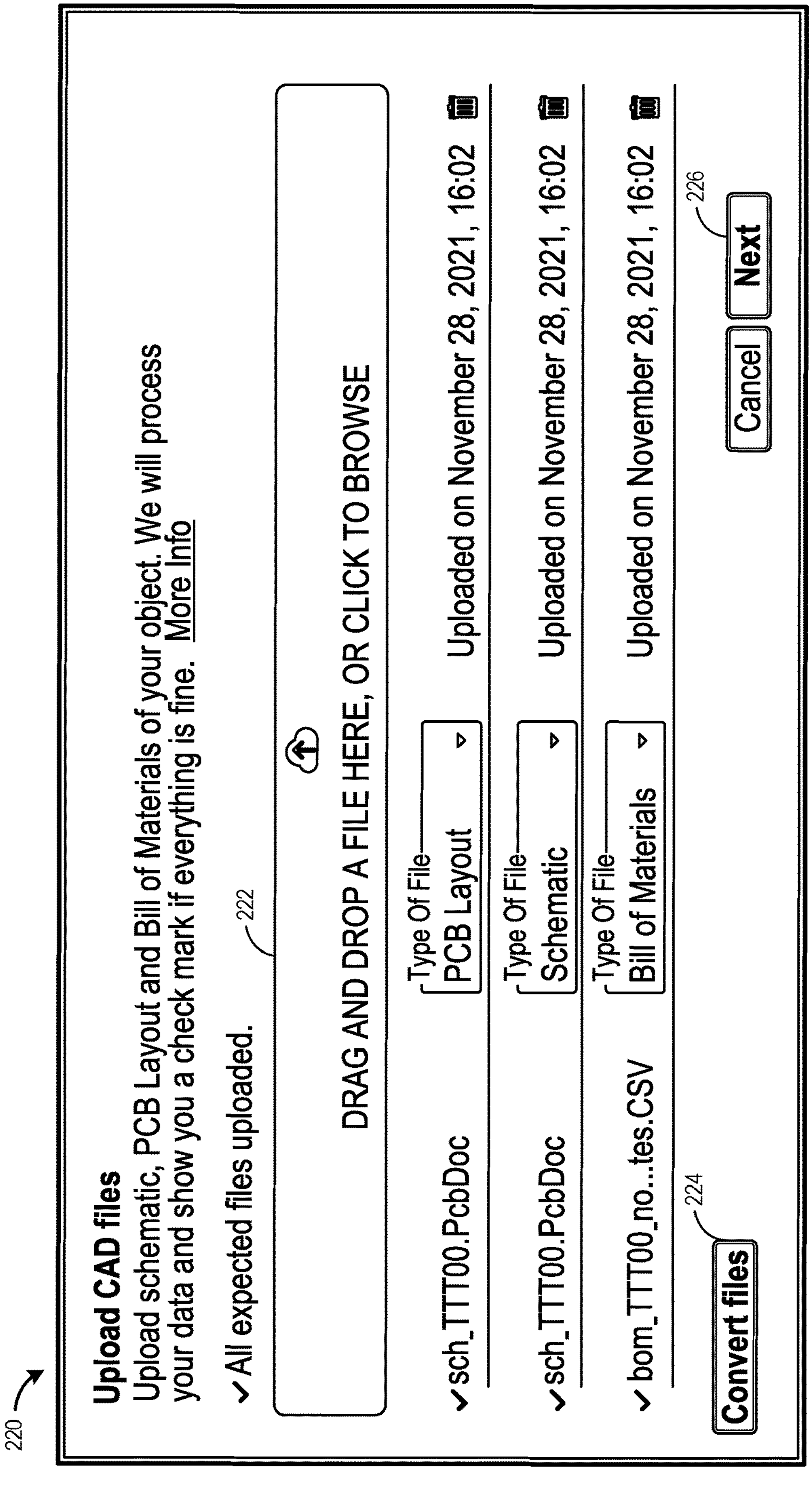

FIG. 2C illustrates an example user interface 220 for uploading design files. The example user interface 220 of FIG. 2C can be presented in response to a user selection of the next element 212 from the user interface 210 of FIG. 2B. A user can use the upload element 222 to upload design files, such as schematic, layout, and bill of materials files. Once uploaded, the user can select the convert element 224 to convert one or more design files to one or more common data formats. After the user has uploaded and converted one or more design files, the user can select the next element 226 to proceed to the next step in the data object configuration process. As described herein, the engineering system 104 can automatically process, extract, and generate hardware design data (such as ports) based on the design files, such as a schematic file. The engineering system 104 can support design files (such as schematics, layout, and BOM files) in various formats, such as design files in various proprietary formats.

Figure 2D:
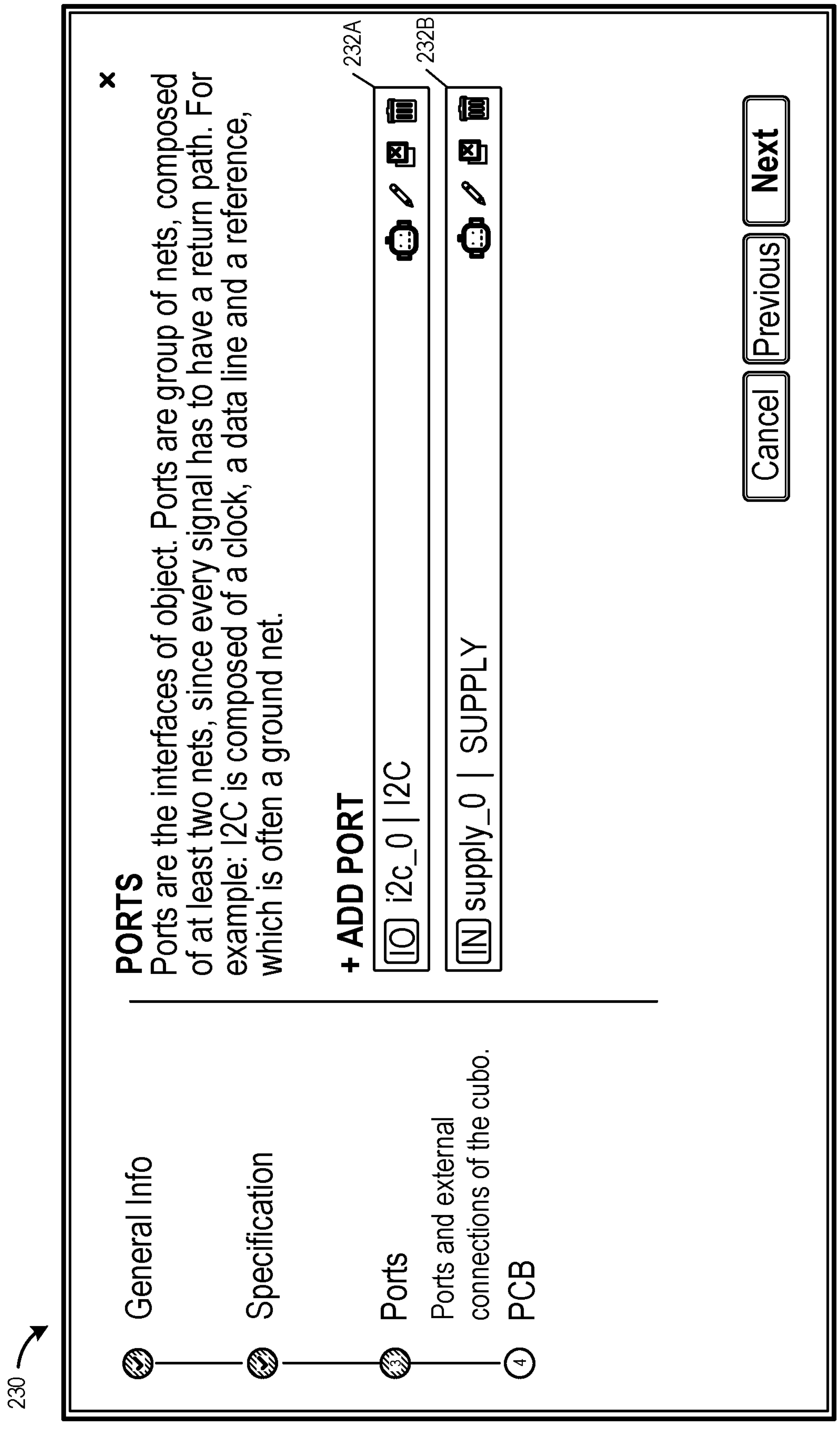

FIG. 2D illustrates an example user interface 230 for reviewing and modifying data from the data object, which can be extracted from the design files. For example, the user interface 230 presents the port elements 232A, 232B in a list. As described herein, the engineering system 104 can automatically detect and add the ports corresponding to the port elements 232A, 232B to the data object based on data from the design files. As shown, example ports can be an I2C port and a supply port. For example, an I2C port can be composed of a clock, a data line, and a reference, such as a ground net. The user interface 230 allows a user to modify or delete an automatically generated port for the data object. The user interface 230 can also allow a user to manually create a port for the data object.

Figure 2E:
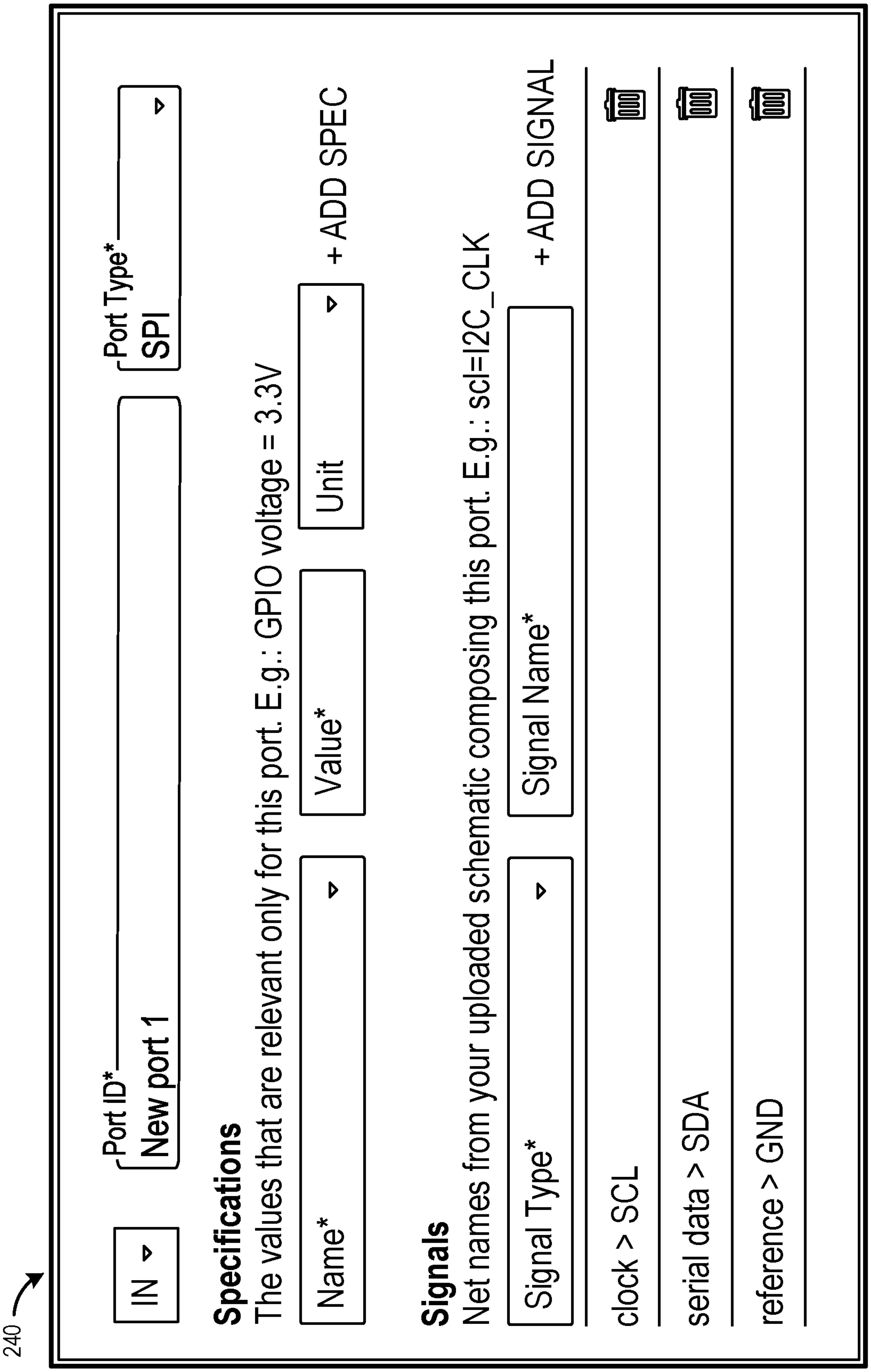

FIG. 2E illustrates an example user interface 240 for adding or modifying a port associated with the design files and the data object. For example, a user can select an add port element or a modify port element from the user interface 230 of FIG. 2D that can cause presentation of the user interface 240 of FIG. 2E. With the user interface 240, a user can specify a port name, a port type, specifications (such as, but not limited to, voltage levels, thresholds, tolerances, etc.), and/or nets or signals for the port. For each net or signal, the user can specify the net/signal type and a net/signal name that maps to a net name in a design file.

Figure 3:
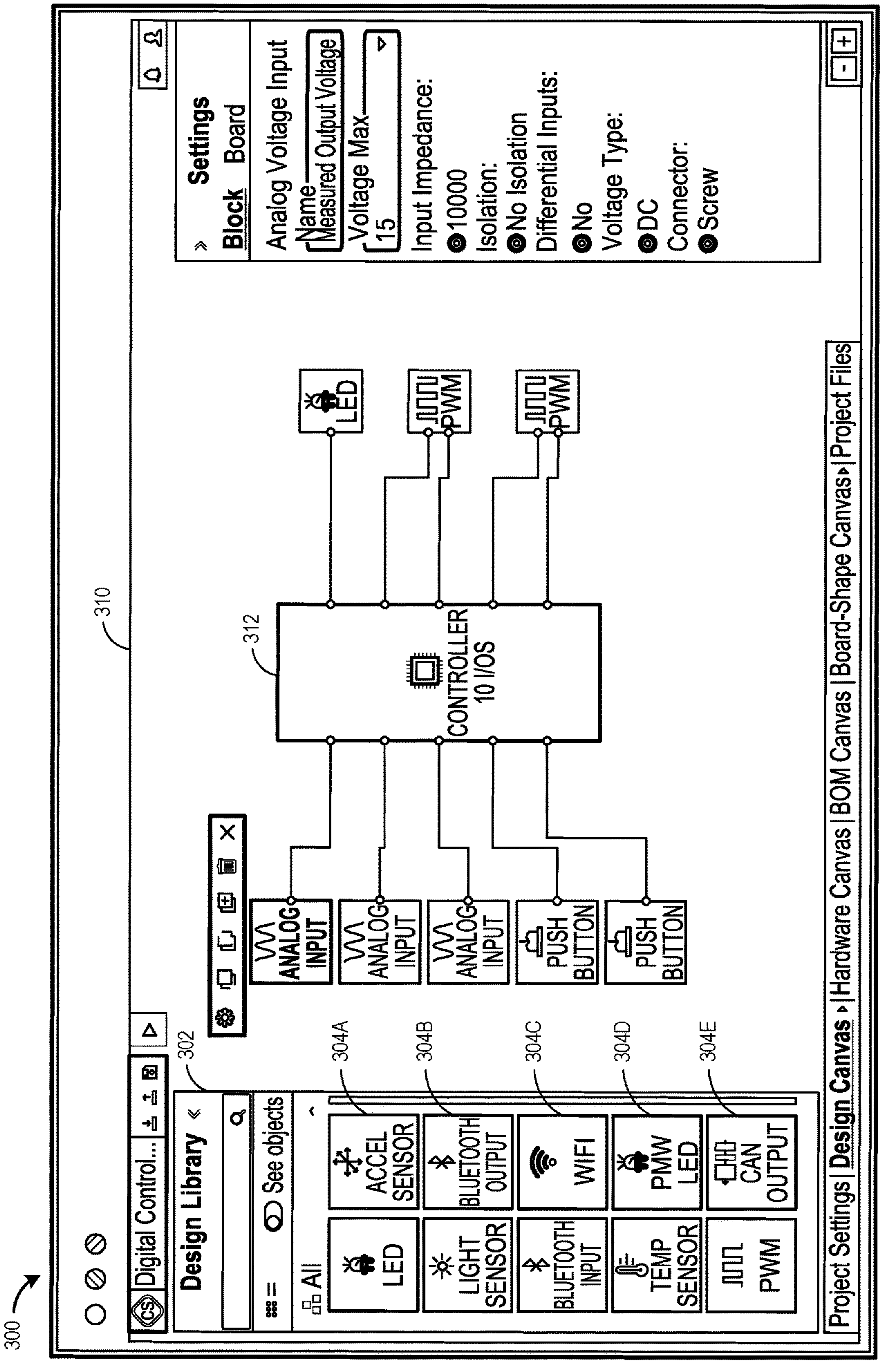
FIG. 3 depicts an example graphical user interface for designing electronic hardware systems.

FIG. 3 illustrates an example user interface 300 for designing electronic hardware systems. One feature of the user interface 300 is the ability to create a representation of a target hardware system as a block diagram. In particular, the user interface 300 includes a library area 302 and a canvas area 310. A user can design the block diagram 312 in the canvas area 310. The user can search for, find, and/or select blocks 304A, 304B, 304C, 304D, 304E to add to the block diagram 312 in the library area 302. Some of the blocks can be low-level data objects that are generated via the data object creation process described above with respect to the user interfaces 200, 210, 220, 230, 240 of FIGS. 2A, 2B, 2C, 2D, 2E. As described herein, blocks can have ports. In the user interface 300 and the canvas area 310, only blocks with compatible ports can be connected. As described herein, the ports can either be automatically generated by the engineering system 104 or manually generated/edited by a user and saved in the hardware design data storage 114.

Figure 4A:
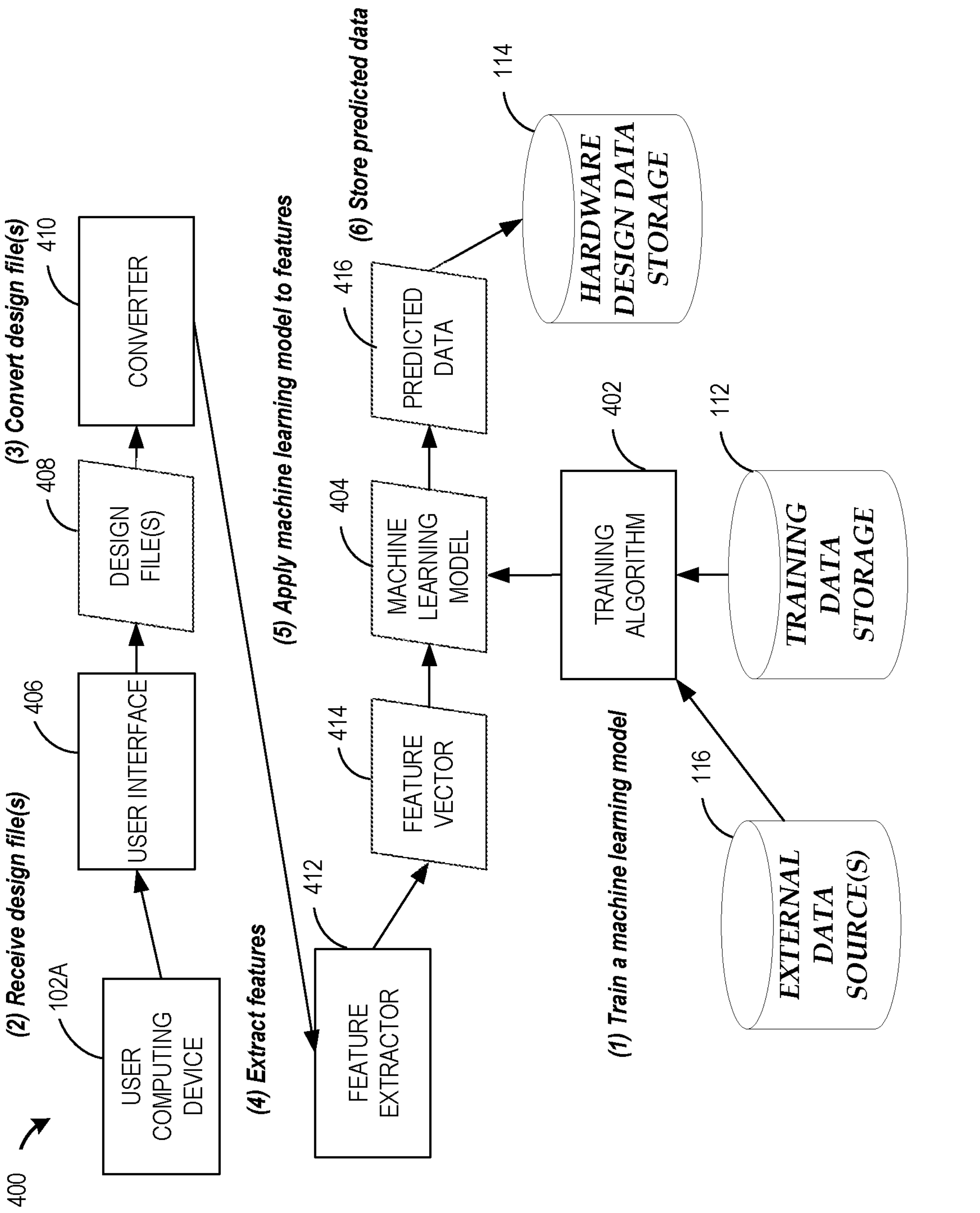
FIGS. 4A-4B are flow diagrams depicting illustrative interactions for extracting and predicting data from design files.

With reference to FIG. 4A, illustrative interactions are depicted for extracting and predicting data from design files. Some of the components of the environment 400 of FIG. 4A can be similar to the environment 100 of FIG. 1. Moreover, some of the interactions and aspects shown in FIG. 4A may be performed by components of the environment 100 of FIG. 1. For example, the user interface server 120 can provide the user interface 406 and the machine learning server 110 can implement the converter 410, the feature extractor 412, and the training algorithm 402. The depicted interactions in FIG. 4A are example interactions, some or all of which may be optional depending on the circumstances or embodiment. Other interactions (not illustrated) may be possible in accordance with the present disclosure in other embodiments.

The interactions of FIG. 4A begin at step one (1) where the machine learning server 110 (not illustrated) can execute a training algorithm 402 to train a machine learning model 404 based on training data from the training data storage 112. The training algorithm 402 can be a supervised machine learning algorithm. For example, one or more of the training data sets from the training data storage 112 can include features with labels. The labels can indicate which nets are grouped together as a port and the type of the port. The machine learning model can be or include an ensemble model, such as a random forest model or a gradient boosted decision tree model. There can be multiple machine learning models, such as a series of machine learning models. The machine learning model can be, but is not limited to, a support vector machine, a graph neural network, or a neural network. In some embodiments, the training algorithm 402 can be used to train a support vector machine, a graph neural network, or a neural network.

In some embodiments, the training algorithm 402 is a random forest algorithm. Accordingly, in some embodiments, the machine learning server 110, executes a random forest algorithm and generates a random forest model as a collection of decision trees. In some embodiments, the decision trees are combined in parallel, also known as bagging. In some embodiments, a decision tree can receive a training data set with features and labels and will output a set of rules that can make a prediction. In some embodiments, a random forest algorithm randomly or pseudo-randomly selects observations and features to build several decision trees and then averages the results. The training algorithm 402 can train a first decision tree from a first subset of the features. The training algorithm 402 can train a second decision tree from a second subset of the features. The training algorithm 402 can generate a combined decision tree from the first decision tree and the second decision tree. In some embodiments, the training algorithm 402 can create random or pseudo-random subsets of the features, build smaller trees using these subsets, and combine the subtrees to address overfitting.

In some embodiments, the training algorithm 402 is a gradient boosted decision tree algorithm. Accordingly, in some embodiments, the machine learning server 110, executes a gradient boosted decision trees algorithm and uses a boosting method to combine individual decision trees. The gradient boosted decision tree algorithm can be implemented with a software library such as the XGBoost library. In some embodiments, the training algorithm 402 combines the decision trees in series. In some embodiments, each tree attempts to minimize the errors of a previous tree and adding trees in series focuses on the errors from the previous tree. In some embodiments, unlike bagging, boosting does not involve bootstrap sampling (creating bootstrap samples by randomly or pseudo-randomly selecting samples from the original data set) and each time a new tree is added, the new tree fits on a modified version of initial data set.

In some embodiments, the machine learning server 110 can execute the training algorithm 402 to train the machine learning model 404 based on data from the external data source 116. In some cases, data from the external data source 116 may have certain usage limitations. A usage limitation on data can include a prohibition on storing the data for more than a period of time, such as twenty-four hours. In such cases, the training algorithm 402 can use the data from the external data source 116 for training purposes and not store the data in the training data storage to comply with the data usage requirements.

At step two (2), the user interface 406 can receive the design file(s) 408 from a user computing device 102A. An example user interface 406 of FIG. 4A for receiving design file(s) 408 can be the same as or similar to the user interface 220 described above with respect to FIG. 2C. At step three (3), the converter 410 can convert the design file(s) 408. As described herein, the design file(s), such as a schematic file, can be in various formats, such as XML, and can further be formatted differently depending on the software that created the design file. The converter 410 can convert the design file(s) to a common data format, such as a JSON data format.

At step four (4), the feature extractor 412 can receive the converted design file(s) and extract features from the file(s). In some embodiments, the feature extractor 412 extracts the nets and properties of the nets (such as a name for the next, connection(s) between the net and other components, a Voltage at a Common Collector (VCC), and/or a ground). In some embodiments, the feature extractor 412 can represent the extracted features as a feature vector 414.

At step five (5), the machine learning model 404 receives the feature vector 414 as input and outputs the predicted data 416. In the case of schematic files, the machine learning model 404 can output the predicted ports from the features of a schematic file. The machine learning model 404 can output probabilities for the predicted ports. There can be multiple port outputs from the machine learning model 404 where each predicted port is associated with multiple nets from the design file. At step six (6), the predicted data 416 can be stored in the hardware design data storage 114.

Figure 4B:
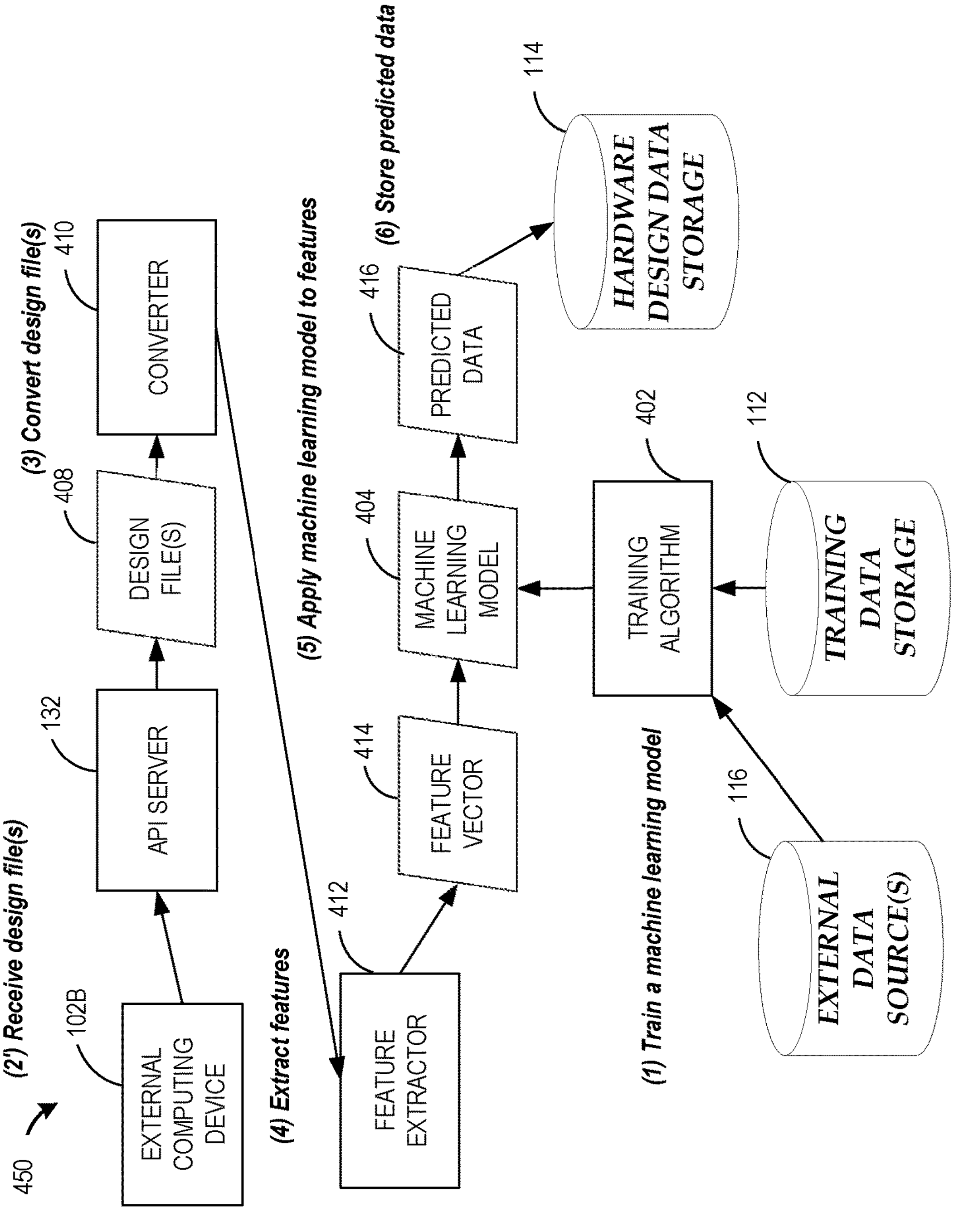

With reference to FIG. 4B, illustrative interactions are depicted for extracting and predicting data from design files provided via an API. Some of the components of the environment 450 of FIG. 4B can be similar to the environment 100 of FIG. 1. FIG. 4B may be similar to FIG. 4A. However, instead step two (2) where the user computing device 102A providing the design file 408 to the user interface 406 as shown in FIG. 4A, at step two-prime (2') the external computing device 102B can call an API to provide the design file 408 to the API server 132 as shown in FIG. 4B. The other steps shown in FIG. 4B can be similar to or the same as the steps described herein with respect to FIG. 4A. The depicted interactions in FIG. 4B are example interactions, some or all of which may be optional depending on the circumstances or embodiment. Other interactions (not illustrated) may be possible in accordance with the present disclosure in other embodiments.

Figure 5:
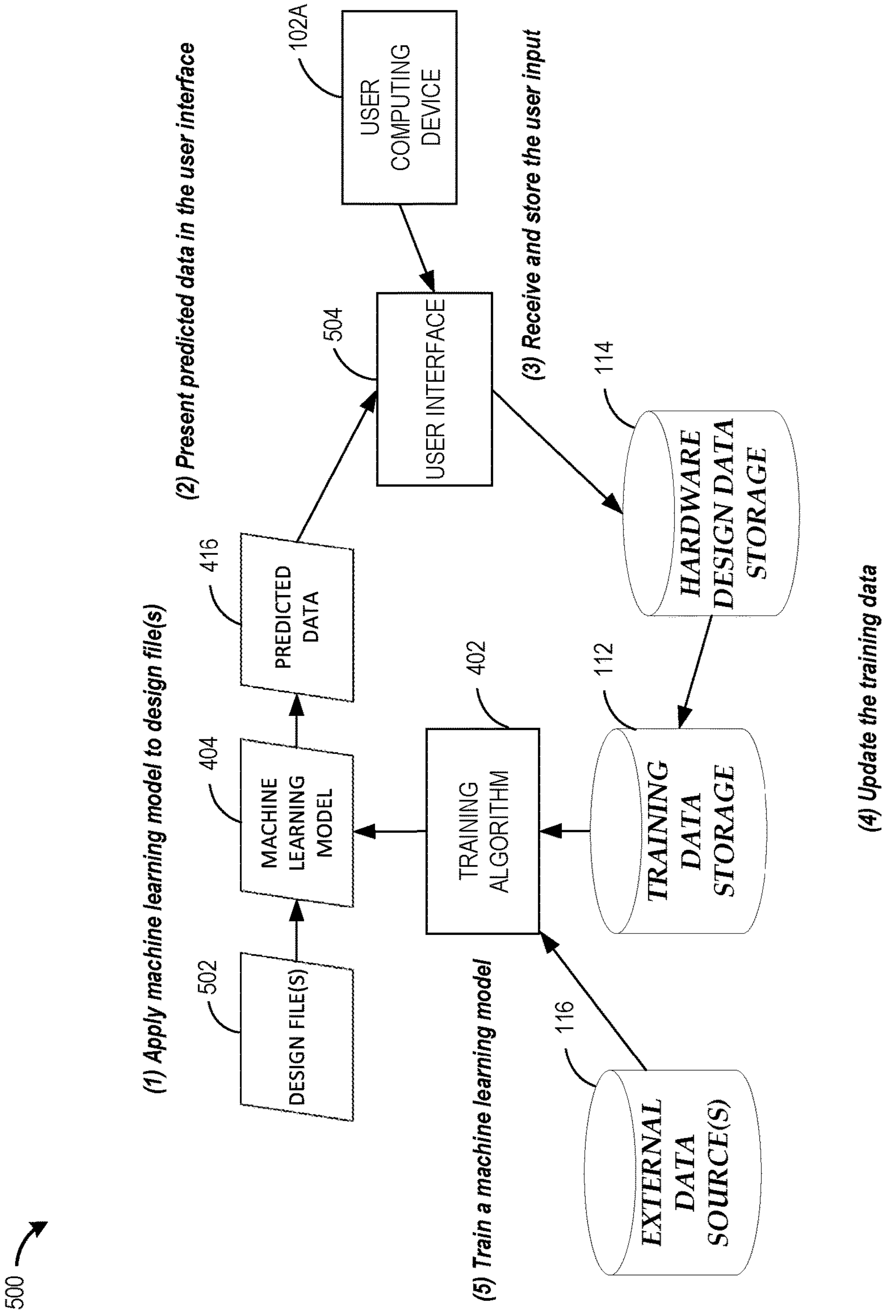
FIG. 5 is a flow diagram depicting illustrative interactions for training a machine learning model with updated training data.

With reference to FIG. 5, illustrative interactions are depicted related to training a machine learning model. The environment 500 of FIG. 5 can be similar to the environments 100, 400 of FIGS. 1 and 4A, respectively. The depicted interactions in FIG. 5 are example interactions, some or all of which may be optional depending on the circumstances or embodiment. Other interactions (not illustrated) may be possible in accordance with the present disclosure in other embodiments. Moreover, the interactions described below with respect to FIG. 5 may be similar to and/or occur as an extension to the interactions described above with respect to FIG. 4A.

At step one (1), the machine learning model 404 can be applied to the design file(s) 502. As described herein, the design file(s) may be converted to a common data format and features may be extracted from the design file(s). The machine learning model 404 receives data based on the design file(s) as input and outputs the predicted data 416, which can include the predicted ports and/or probabilities for the predicted ports.

At step two (2), the user interface 504 can present the predicted data 416. An example user interface 504 of FIG. 5 for presenting predicted data can be the same as or similar to the user interface 230 described above with respect to FIG. 2D. At step three (3), the user interface 504 can receive user input from the user computing device 102A, such as new ports or modifications to existing ports. An example user interface 504 of FIG. 5 for receiving user input can be the same as or similar to the user interface 240 described above with respect to FIG. 2E. The user interface 504 can store the user input in data objects in the hardware design data storage 114.

At step (4), the training data can be updated. For example, the new or modified design data that was received as user input can be included in an updated training data set that is stored in the training data storage 112. A step five (5), the training algorithm 402 can use the updated training data set to train a new machine learning model 404. Therefore, the machine learning model can improve over time as additional user input is received. Also as shown and described herein, the training algorithm 402 can use data from the external data source 116 for training purposes.

Figure 6:
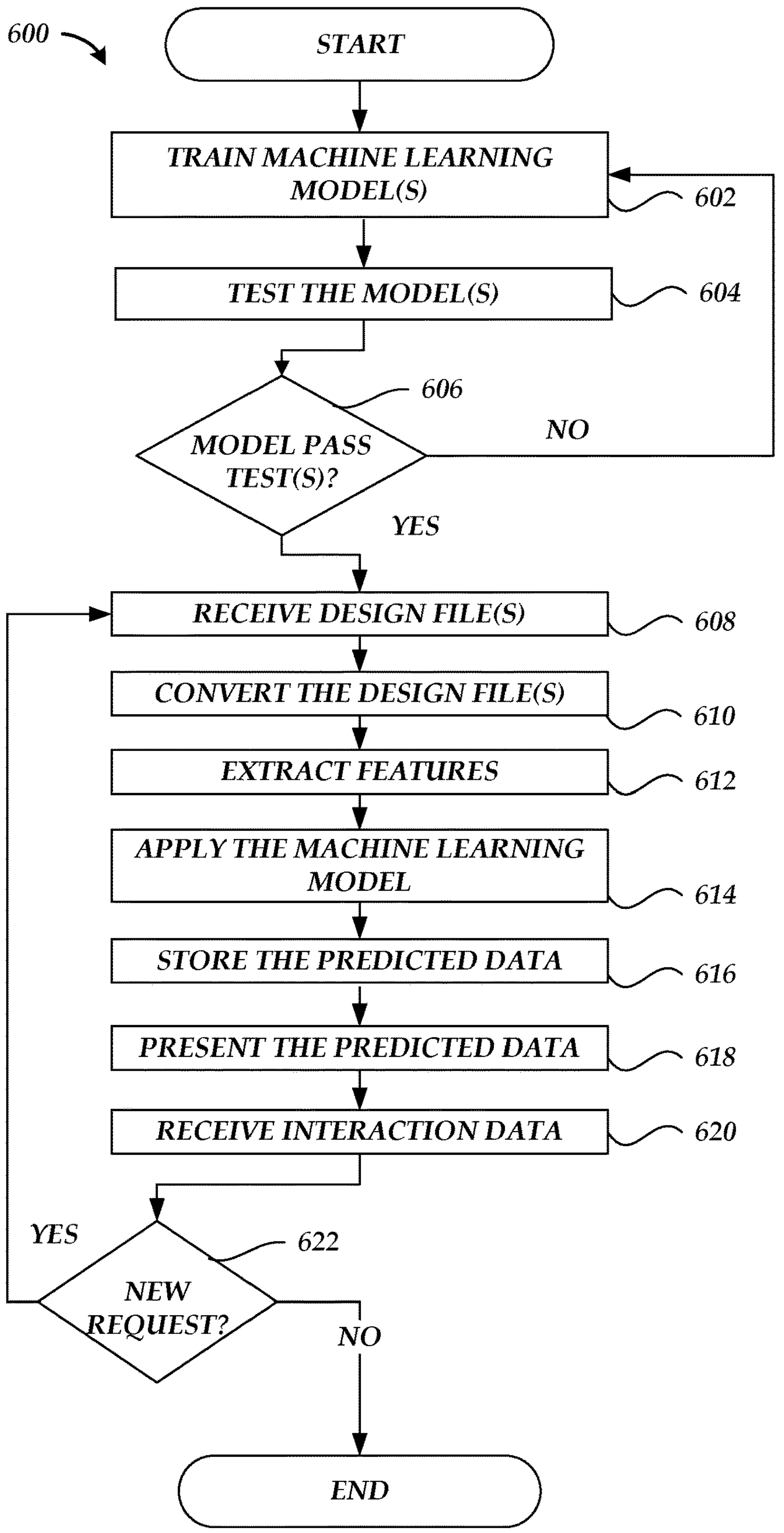
FIG. 6 is a flow chart depicting an example method for machine learned prediction of hardware design data from design file(s).

FIG. 6 is a flow diagram depicting an example method 600 implemented by the engineering system 104 for prediction of hardware design data from design file(s), among other things. As described herein, the engineering system 104 may include the machine learning server 110. In some embodiments, the machine learning server 110 may implement a machine learning service that implements aspects of the method 600. Some aspects of the method 600 may be implemented by other components of the engineering system 104, such as the user interface server 120. Moreover, some aspects of the method 600 may be described above with respect to FIGS. 4A, 4B, and 5.

Beginning at block 602, one or more machine learning models can be trained. In particular, the machine learning server 110 can train one or more machine learning models with a training data set. The machine learning server 110 can train one or more machine learning models using supervised machine learning and/or weak supervision. In some embodiments, the machine learning server 110 can generate the training data set. For example, the machine learning server 110 can retrieve training data from the training data storage 112. The machine learning server 110 can extract attributes from the training data (such as schematics data) and transform the attribute values into features, such as, but not limited to, one or more feature vectors. For a data item (such as a net), the machine learning server 110 can transform the attributes (for example, a name of a net, a connection between two nets, and/or a net type) of the data item into a feature vector that includes a series of numbers (for example, [$a_1$, $a_2$, $a_3$, $a_4$, etc.]). A feature vector can be a numerical representation of the attribute value. The attribute value can be a textual string. There can be a one-to-one correspondence between a numerical representation of an attribute value and the attribute value itself. For example, "VCC" can be assigned a numerical value of 1 and "GND" can be assigned a numerical value of 12. Thus, a training data set can include attributes in a feature vector format. Training data sets can be stored in the training data storage 112 for later reuse. The machine learning server 110 can train the machine learning model to estimate features based on patterns in the training data. In some embodiments, the training data can include a topological representation of hardware components. Therefore, in some embodiments, a machine learning model can be trained to estimate features based on topological patterns in the training data.

The machine learning server 110 can train at least one of a support vector machine, a graph neural network, or a neural network. In the case of a graph neural network, the training input data can include one or more graphs, as described herein. In some embodiments, the machine learning server 110 can train multiple machine learning models in a series. As described herein, output from a first model can be provided as input to a second model for prediction purposes.

In the supervised machine learning embodiments, the training data set includes labels. As described herein, the labels can indicate which nets are grouped together as a port and the type of the port (which itself can indicate the net names, connections, etc. that are associated with a particular type of port). In some embodiments, the labels can be based on human-made annotations. The machine learning server 110 can train one or more ensemble models, such as random forest models and/or gradient boosted decision tree models. In some embodiments, the machine learning server 110 trains multiple machine learning models of different types (such as a random forest model and a gradient boosted decision tree model or other models as described herein) and one model can be selected over another to be used to classify user-provided data.

As described above with respect to FIG. 4A, the machine learning server 110 can execute a random forest algorithm that generates a random forest model. The machine learning server 110 can randomly or pseudo-randomly select observations and features to build several decision trees and then averages the results. In some embodiments, the machine learning server 110 trains a first decision tree from a first subset of the features; the machine learning server 110 trains a second decision tree from a second subset of the features. The machine learning server 110 generates a combined decision tree from the first decision tree and the second decision tree. In some embodiments, the machine learning server 110 can prevent overfitting by creating random or pseudo-random subsets of the features, building smaller trees using these subsets, and combining the subtrees. As a result, the machine learning server 110 outputs a random forest model that is a collection of decision trees.

As described above with respect to FIG. 4A, the machine learning server 110 can execute a gradient boosted decision tree algorithm that generates a gradient boosted decision tree. The machine learning server 110 can implement a software library such as the XGBoost library to generate a gradient boosted decision tree. The machine learning server 110 uses boosting to generate a gradient boosted decision tree. Accordingly, the machine learning server 110 combines decision trees in series and each time a new tree is added, the new tree fits on a modified version of initial data set. As a result, the machine learning server 110 outputs a gradient boosted decision tree that is a collection of decision trees.

In some embodiments, the machine learning server 110 can train a machine learning model using weak supervision. In other words, some of the labels in the training data set may not be directly from human made annotations. In some embodiments, one or more statistical methods can be used to extrapolate and annotate the training data. The machine learning server 110 can use a statistical method to extrapolate labels based on some human-made labels.

At block 604, the one or more machine learning model(s) can be tested. The machine learning server 110 can generate one or more scores for a machine learning model. In some embodiments, scores include a precision score (a positive predictive value, such as the number of true positive results divided by the number of all positive results), a recall score (which measures sensitivity, such as the number of true positive results divided by the number of all samples that should have been identified as positive), and/or an F1 score (the weight average of precision and recall). As another example, the machine learning server 110 can generate an N×N matrix to evaluate the performance of the machine learning model, where N is the number of target classes, which can be referred to as a confusion matrix. In some embodiments, a confusion matrix compares the actual target values with those predicted by the machine learning model. A confusion matrix can provide a holistic view of how well a classification model is performing and what kinds of errors the model is making. The results of the confusion matrix can be mapped to true positive (TP) results (the actual value was positive and the model predicted a positive value), true negative (TN) results (the actual value was negative but the model predicted a positive value), false positive (FP) results (the actual value was negative but the model predicted a positive value), and false negative (FN) results (the actual value was positive but the model predicted a negative value). The machine learning server 110 can generate an accuracy score from the confusion matrix by calculating a combination of TP, TN, FP, and FN results. In some embodiments, the machine learning server 110 generates the accuracy score with the following formula: (TP+TN)/(TP+FP+TN+FN).

At block 606, it can be determined whether the one or more machine learning models pass the test(s) from the previous blocks. The machine learning server 110 can pass a model if the test results for the model pass a threshold value. A machine learning model can pass a test if the precision, recall, F1 score, or accuracy value is above a threshold value. Additionally or alternatively, a data analyst can pass or reject a model by manually review the test score or by reviewing the confusion matrix results. In some embodiments, where multiple machine learning models of different types are generated, one machine learning model can be selected over another. For example, a data analyst can select a random forest model over a gradient boosted decision tree model if the random forest model test results are better than the gradient boosted decision tree model test results. The method 600 can return to block 602 to train a machine learning model until the model passes the check at the present block 606.

In some embodiments, a machine learning model can be trained iteratively based on different training data sets. Thus, the method 600 can return to block 602 to train the model with a different training data set. Accordingly, the method 600 can continue training until the result model passes the check at block 606.

At block 608, one or more design files can be received. The user interface server 120 can receive the one or more design files, such as a schematic file. As described herein, a schematic file can include multiple nets. Each net can have, but are not limited to, a name, connections to other components, and/or a type, as defined in the schematic file. An example graphical user interface for receiving the design files can be similar to the user interface 220 described above with respect to FIG. 2C. The user interface server 120 can receive design files from the user computing device 102A. A user, via a graphical user interface, can upload design files, such as schematic, layout, and bill of materials files. The user interface server 120 can support receiving design files (such as schematics, layout, and BOM files) in various formats, such as design files in various proprietary formats. In some embodiments, the external computing device 102B can call an API to provide one or more design files to the engineering system 104 via the API server 132.

At block 610, the one or more design files can be converted. A server (such as the user interface server 120 or the machine learning server 110) can generate, from the one or more design files in a first data format (such as a schematic file in a first data format), a converted design file to a second data format (such as a converted schematic file). As described herein, the design file(s), such as a schematic file, can be in various formats, such as XML and/or a proprietary data format. In some embodiments, the design file(s) supported can be composed of multiple files and/or machine-encoded binary formats. The server can convert the design file(s) to a common data format, such as a JSON or BSON data format. Each proprietary data format may encode data differently. In some embodiments, the design file(s), which may be in a proprietary data format, includes, but is not limited to, geometric data, electronic data, mechanical data, engineering data, library data, and/or dependency mappings data. Accordingly, in some embodiments, the server converts the data (such as, but not limited to, geometric data, electronic data, mechanical data, engineering data, library data, and/or dependency mappings data) in a proprietary data format to a common data format. For example, an arc in the design file can be represented by three points or with a start angle and an end angle. The server can convert arcs represented in different formats to a standard format, such as by representing all arcs with three points, for example. Accordingly, the engineering system 104 can convert design files (such as a schematic file) that are in multiple data formats to a standardized data format.

In some embodiments, an additional conversion for the design files can include applying special formatting rules. Different formats can have different rules for formatting elements in the design files, such as allowing spaces in net names. Accordingly, a server (such the machine learning server 110) can apply special formatting rules to the design files before proceeding to the machine learning model. For example, space characters or other special characters can be replaced with a placeholder character (such as an underscore character). After the output has been received from the model, the server can revert any replaced characters to the original format.

At block 612, features can be extracted. The machine learning server 110 can determine a feature vector based on the design file(s). In particular, the machine learning server 110 can determine a feature vector from a converted file (such as a converted schematic file). Similar to the machine learning server 110 extracting features from training data, the machine learning server 110 can extract features based on the design file(s). The machine learning server 110 can extract attributes from the design file(s) (such as the converted schematic file) and transform the attribute values in the file(s) into a feature vector. For a data item (such as a net) in the design file, the machine learning server 110 can transform the attributes (for example, a name of a net, a connection between two nets, and/or a net type, such as a VCC net or a ground net) of the data item into a feature vector that includes a series of numbers (for example, [$a_1$, $a_2$, $a_3$, $a_4$, etc.]).

One or more of the features can be based on a net from a design file, such as the converted design file. In some embodiments, one or more features can include: (i) a first feature for a name of the first net, (ii) a second feature based on the name of the first net, (iii) a third feature for a type of the first net, (iv) a fourth feature indicating a same type for the first net and a second net in the design file, (v) a fifth feature for a connection between the first net and a component or a pin, (vi) a sixth feature based on a name of a pin connected to the first net, (vii) a seventh feature indicating a number of connections between the first net and a component or a pin, or (viii) an eighth feature for a connection between the first net and another net through a component. The machine learning server 110 can determine a feature based on text associated with a net, such as the name of a net. The machine learning server 110 can use a regular expression or similar pattern matching to determine features from text associated with a net. The machine learning server 110 can determine that a net name is associated with a voltage level and, therefore, the net may be a supply net. Some regular expressions or pattern matching can include or be similar to *V* or *.*V (where * can be any number), which may indicate a voltage level and, therefore, may indicate a supply net. As another example, the machine learning server 110 can determine that a net name includes any of the following text, "SCL", "_SCL", or "-SCL", which can indicate a serial clock net.

The machine learning server 110 can determine a feature based on text associated with a pin, such as the name of a pin. The machine learning server 110 can use a regular expression or similar pattern matching to determine features from text associated with a pin. The machine learning server 110 can determine that a pin name includes any of the following text, "VCC", "VDD", or "SUPPLY", which can indicate a supply pin. Some regular expressions or pattern matching can include or be similar to +*V (where * can be any number), which may indicate a voltage level and, therefore, may indicate a supply pin. The machine learning server 110 can determine that a pin name includes any of the following text, "MISO" or "MOSI," which can indicate an Serial Peripheral Interface (SPI). The machine learning server 110 can determine that a pin name includes any of the following text, "GND", "VSS", or "VEE" which can indicate a ground pin.

In some embodiments, one or more features can include: (i) a first feature for a name of the first net, (ii) a second feature based on the name of the first net, (iii) a third feature indicating a same type for the first net and a second net in the design file, (iv) a fourth feature for a connection between the first net and a first component or a first pin, and (v) a fifth feature based on a name of a pin connected to the first net. In some embodiments, one or more features can include: (i) a name of a net; (ii) a connection between two nets, (iii) a connection between the net and a Voltage at a Common Collector (VCC) net, (iv) a connection between the net and a ground (GND) net, (v) a connection between the net and a power supply, (vi) a connection between the net and a power supply via a resistor or capacitor, and/or (vii) a number of resistors or capacitors connected to the net. In an embodiment, the features can include at least: (i) a name of the net, and (ii) a connection between the net and another net. In the generated feature vector, there can be a one-to-one correspondence between a numerical representation of an attribute value and the attribute value itself. The machine learning server 110 can assign "VCC" a numerical value of 1 and can assign "GND" a numerical value of 12. In an embodiment, a feature such as a connection between the net and a ground (GND) net can be indicated by a numerical value and the numerical value can indicate the presence or lack thereof of a property. For example, a "0" value can indicate that the net is not connected to a ground (GND) net and a "1" value can indicate that the net is connected a ground (GND) net. The convention for using a numerical value to indicate whether a property is present or not can be applied to other features such as: a connection between the net and a Voltage at a Common Collector (VCC) net, a connection between the net and a power supply, and/or a connection between the net and a power supply via a resistor or capacitor.

In some embodiments, such as in the context of a machine learning model that is a graph neural network, the machine learning server 110 can determine an input graph based on the design file. In some embodiments, the machine learning server 110 can convert elements from a design file into a graph, such as, but not limited to, components into nodes and nets as edges in a graph, or vice versa, nets into nodes and components into edges in a graph.

At block 614, the machine learning model can be applied. The machine learning server 110 can apply a machine learning model to the feature vector to predict hardware design data. Input to the machine learning model can include at least the feature vector. In the case of port prediction based on features from a design file, output of the machine learning model can include at least multiple ports. Output of the machine learning model can include at least probabilities for the multiple ports. Each port from the predicted ports can be associated with a set of nets from the design file. The machine learning model can be configured to output multiple classes, such as multiple ports. Each predicted port can have a port type. Example port types can include, but are not limited to, a dual in-line memory module (DIMM) port type, a reset port type, a clock port type, an in-circuit serial programming (ICSP) port type, a general-purpose input/output (GPIO) port type, a general-purpose input (GPI) port type, a general-purpose output (GPO) port type, an inter-integrated circuit (I2C) port type, an ADC port type, a reduced media-independent interface (RMII) port type, and/or a supply port type. For example, the I2C port can include of the following nets: a clock net, a data line net, and a reference net. In some embodiments, multiple machine learning models (such as a series of machine learning models) can be applied. A first machine learning model can be trained to output the net types (or a representation of the net types as an output vector) based on an input design file. A second machine learning model can be trained to receive the output from the first machine learning model to output predicted ports. In some embodiments, the machine learning server 110 can apply a trained graph neural network to the input graph. The graph neural network can be configured to output multiple classes, such as multiple ports.

At block 616, the predicted data can be stored. The machine learning server 110 can store the predicted data (such as the predicted ports) in the hardware design data storage 114. The machine learning server 110 can store at least some of the predicted data in a data object, which can be stored in the hardware design data storage 114. For example, the machine learning server 110 can generate a data object and the data object can include the predicted port. As described herein, the generated data objects can be used to design electronic hardware systems.

At block 618, the predicted data can be presented. The user interface server 120 can present the predicted data in a graphical user interface. The user interface server 120 can present the predicted data in a graphical user interface after a design file has been processed, such as the user interfaces 230, 240 described above with respect to FIGS. 2D, 2E. Additionally or alternatively, the user interface server 120 can present the predicted data in a design graphical user interface, such as the user interface 300 described above with respect to FIG. 3. For example, the user interface server 120 can present at least a port from the predicted ports in a graphical user interface.

At block 620, user interaction data can be received. The user interface server 120 can receive user interaction data. The user interface server 120 can receive user interaction data after a design file has been processed, such as the user interfaces 230, 240 described above with respect to FIGS. 2D, 2E. The user interface server 120 can receive user input corresponding to a user modifying data associated with a predicted port. For example, a user can add or remove the nets associated with a predicted port. The user interface server 120 can generate a modified port based at least in part on the user input and store, in the hardware design data storage 114, the modified port.

Additionally or alternatively, the user interface server 120 can receive interaction data associated with a design graphical user interface. As described herein, an example design graphical user interface is the user interface 300 described above with respect to FIG. 3. For example, via a design graphical user interface, a user can select a first data object. Continuing with the example, in response to the user selection, the user interface server 120 can add the first data object to a data model (such as a model representing a circuit). In the example, the first data object can be connected to a second data object in the data model and a first port of the first data object can be compatible with a second port of the second data object. The user interface server 120 can present, in a design graphical user interface, a block diagram corresponding to the data model. If the machine learning model outputs two or more probabilities that a net is associated with two or more ports, the engineering system 104 can select the port that satisfies a threshold value and/or the highest probability. Additional details regarding matching port types for hardware component resolution can be found in U.S. Provisional Application No. 63/371,500, filed Aug. 15, 2022, entitled "SYSTEMS AND METHODS FOR AUTOMATED ELECTRONICS DESIGN AND GRAPHICAL USER INTERFACE."

At block 622, it is determined whether there are new requests to process design file(s). The user interface server 120 can receive multiple requests from the same user computing device 102A. Additionally, the user interface server 120 can receive additional requests from different user computing devices 102A. Accordingly, the method 600 can return to block 608 for receiving additional design files. As described herein, the engineering system 104 can reuse the same machine learning model for a period of time to predict hardware design data. If there are no additional requests, the method 600 can end.

In some embodiments, a new machine learning model can be trained or re-trained. In some cases, a machine learning engineer can review and approve new training data before any training or re-training can happen. The machine learning server 110 can train a new machine learning model or re-train a machine learning model based on updated training data. As described above, user interaction data can be received, such as a user modifying a port. The machine learning server 110 can generate an updated training data set based on the interaction data (such as a modified port) by adding new labels to the training data. For example, the machine learning server 110 can add a label to the training data that associated the modified port with multiple nets in the training data. In some embodiments, the updated training data can include labels based on human made annotations of training data. For example, a human can label ports in the design data used for training. Accordingly, the machine learning model predictions can improve over time as new user input is received. In particular, the machine learning model can be improved over time to detect a greater number of ports over time.

Figure 7:
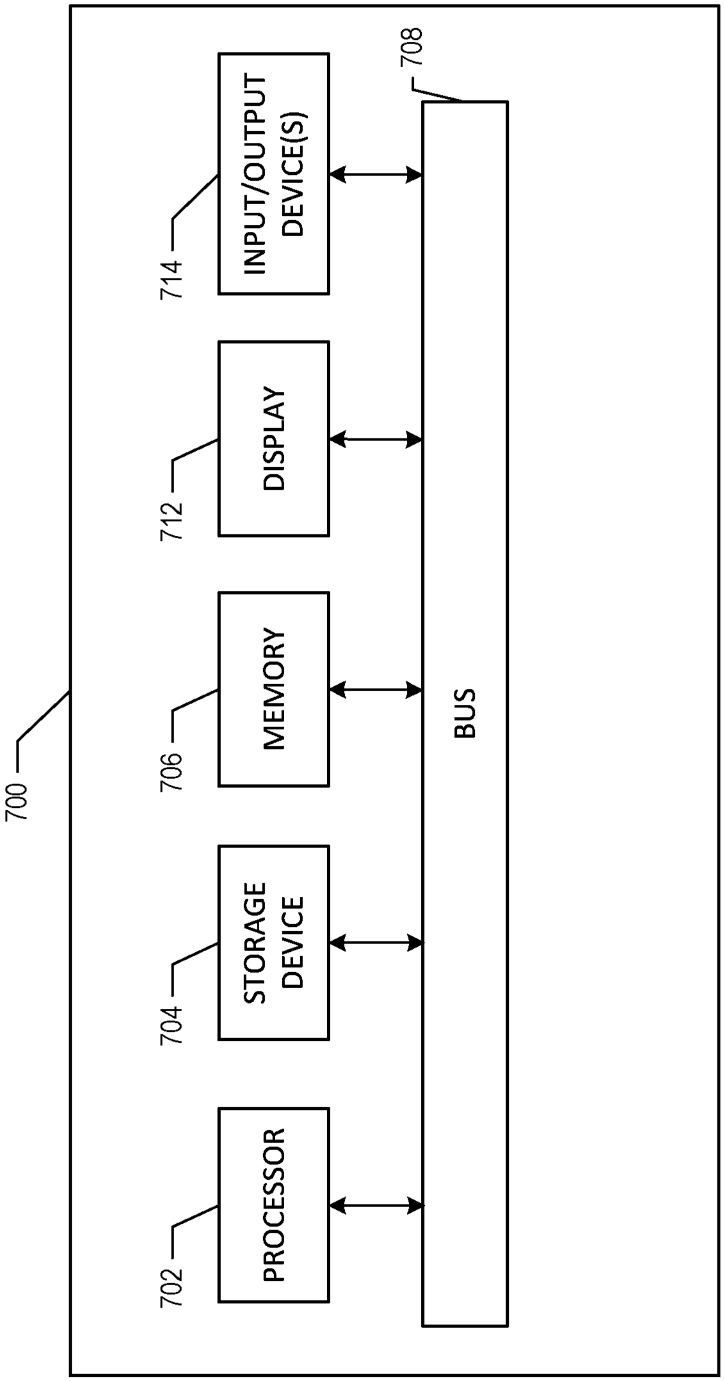
FIG. 7 is a block diagram illustrating an example computing system with which various methods and systems discussed herein may be implemented.

FIG. 7 is a block diagram that illustrates example components of a computing device 700. The computing device 700 can implement aspects of the present disclosure. Using FIG. 1 as an example, the machine learning server 110 or the user interface server 120 of FIG. 1 can be implemented in a similar manner as the computing device 700. The computing device 700 can communicate with other computing devices.

The computing device 700 can include a hardware processor 702, a data storage device 704, a memory device 706, a bus 708, a display 712, and one or more input/output devices 714. The hardware processor 702 can also be implemented as a combination of computing devices, e.g., a combination of a digital signal processor and a microprocessor, a plurality of microprocessors, one or more microprocessors in conjunction with a digital signal processor, or any other such configuration. The hardware processor 702 can be configured, among other things, to execute instructions to perform one or more functions. The data storage device 704 can include a magnetic disk, optical disk, solid state drive, or flash drive, etc., and is provided and coupled to the bus 708 for storing information and instructions. The memory device 706 can include one or more memory devices that store data, such as, without limitation, random access memory (RAM) and read-only memory (ROM). The computing device 700 may be coupled via the bus 708 to the display 712, such as an LCD display or touch screen, for displaying information to a user, such as an engineer. The computing device 700 may be coupled via the bus 708 to one or more input/output devices 714. The input device 714 can include, but is not limited to, a keyboard, mouse, digital pen, microphone, or touch screen.

A machine learning application may be stored on the memory device 706 and executed as a service by the hardware processor 702. In some embodiments, the machine learning application may implement various aspects of the present disclosure. For example, the machine learning application may train a machine learning model configured to predict hardware design data from design files.

It is to be understood that not necessarily all objects or advantages may be achieved in accordance with any particular embodiment described herein. Certain embodiments may be configured to operate in a manner that achieves or optimizes one advantage or group of advantages as taught herein without necessarily achieving other objects or advantages as may be taught or suggested herein.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language used herein, such as, among others, "can," "might," "may," "e.g.," "for example," and the like, unless specifically stated otherwise, or otherwise understood within the context as used, is generally intended to convey that certain embodiments include, while other embodiments do not include, certain features, elements, or states. Thus, such conditional language is not generally intended to imply that features, elements or states are in any way required for one or more embodiments.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Such disjunctive language is not generally intended to, and should not, imply that certain embodiments require at least one of X, at least one of Y, and at least one of Z to each be present. Thus, the term "or" is used in its inclusive sense (and not in its exclusive sense) so that when used, for example, to connect a list of elements, the term "or" means one, some, or all of the elements in the list.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The terms "comprising," "including," "having," and the like are synonymous and are used inclusively, in an open-ended fashion, and do not exclude additional elements, features, acts, operations, and so forth.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A computer-implemented method comprising:

under control of a computer hardware processor configured with computer executable instructions, receiving, via a first graphical user interface, a design file including at least a plurality of nets;

generating, from the design file, a converted design file;

determining a feature vector based on the converted design file;

applying a machine learning model, wherein input to the machine learning model includes at least the feature vector, wherein output of the machine learning model includes at least a plurality of ports, wherein each port of the plurality of ports is associated with a subset of the plurality of nets and is associated with a port type;

storing, in a data storage medium, the plurality of ports in association with a first data object, wherein the first data object includes the plurality of ports and is usable to design an electronic hardware system; and causing presentation, in a second graphical user interface, of at least a first port from the plurality of ports, wherein the first port of the first data object is compatible with a second port of a second data object in a data model representing a circuit.

2. The computer-implemented method of claim 1, wherein storing the plurality of ports further comprises:

generating the first data object including at least the first port; and storing, in the data storage medium, the first data object.

3. The computer-implemented method of claim 2, further comprising:

receiving, via the second graphical user interface, a user selection of the first data object;

adding the first data object to the data model representing the circuit, wherein the first data object is connected to the second data object in the data model; and causing presentation, in the second graphical user interface, of a block diagram corresponding to the data model.

4. The computer-implemented method of claim 2, further comprising:

receiving, via the second graphical user interface, user input associated with the first port;

generating a modified first port based at least in part on the user input; and storing, in the data storage medium, the modified first port.

5. The computer-implemented method of claim 1, wherein a first data format of the design file is different than a second data format of the converted design file.

6. A computer-implemented method comprising:

under control of a computer hardware processor configured with computer executable instructions, receiving a design file including at least a plurality of nets;

determining a feature vector based on the design file;

applying a first machine learning model, wherein input to the first machine learning model includes at least the feature vector, wherein output of the first machine learning model includes at least a plurality of ports, wherein each port of the plurality of ports is associated with a subset of the plurality of nets and is associated with a port type;

storing, in a data storage medium, the plurality of ports in association with a first data object, wherein the first data object includes the plurality of ports and is usable to design an electronic hardware system; and causing presentation, in a second graphical user interface, of at least a first port from the plurality of ports, wherein the first port of the first data object is compatible with a second port of a second data object in a data model representing a circuit.

7. The computer-implemented method of claim 6, wherein storing the plurality of ports further comprises:

generating the first data object including at least the first port; and storing, in the data storage medium, the first data object.

8. The computer-implemented method of claim 7, further comprising:

receiving, via the second graphical user interface, a user selection of the first data object; and adding the first data object to the data model, wherein the first data object is connected to the second data object in the data model.

9. The computer-implemented method of claim 7, further comprising:

receiving, via the second graphical user interface, user input associated with the first port;

generating a modified first port based at least in part on the user input; and storing, in the data storage medium, the modified first port.

10. The computer-implemented method of claim 9, further comprising:

generating an updated training data set based on the modified first port, wherein generating the updated training data set further includes at least:

adding a label associated with the modified first port to a training data set; and training a second machine learning model based on the updated training data set.

11. The computer-implemented method of claim 10, wherein the label corresponds to a port type for the modified first port.

12. The computer-implemented method of claim 6, wherein determining the feature vector further includes at least:

determining a plurality of features based on a first net in the design file, wherein the plurality of features includes at least:

(i) a first feature for a name of the first net, (ii) a second feature based on the name of the first net, (iii) a third feature for a type of the first net, (iv) a fourth feature indicating a same type for the first net and a second net in the design file, (v) a fifth feature for a connection between the first net and a first component or a first pin, (vi) a sixth feature based on a name of a pin connected to the first net, (vii) a seventh feature indicating a number of connections between the first net and a second component or a second pin, or (viii) an eighth feature for a connection between the first net and another net through a third component.

13. The computer-implemented method of claim 6, wherein the first machine learning model corresponds to at least one of a random forest model, a gradient boosted decision tree model, a support vector machine, or a neural network.

14. A system comprising:

a data storage medium; and one or more computer hardware processors in communication with the data storage medium, wherein the one or more computer hardware processors are configured to execute computer-executable instructions to at least:

receive a design file including at least a plurality of nets;

determine a feature vector based on the design file;

apply a machine learning model, wherein input to the machine learning model includes at least the feature vector, wherein output of the machine learning model includes at least a plurality of ports, wherein each port of the plurality of ports is associated with a subset of the plurality of nets and is associated with a port type;

store, in the data storage medium, the plurality of ports in association with a first data object, wherein the first data object includes the plurality of ports and is usable to design an electronic hardware system; and cause presentation, in a second graphical user interface, of at least a first port from the plurality of ports, wherein the first port of the first data object is compatible with a second port of a second data object in a data model representing a circuit.

15. The system of claim 14, wherein storing the plurality of ports further comprises:

generating the first data object including at least the first port; and storing, in the data storage medium, the first data object.

16. The system of claim 15, wherein the one or more computer hardware processors are configured to execute further computer-executable instructions to at least:

receive, via the second graphical user interface, a user selection of the first data object; and add the first data object to the data model representing the circuit, wherein the first data object is connected to the second data object in the data model.

17. The system of claim 14, wherein the one or more computer hardware processors are configured to execute further computer-executable instructions to at least:

receive, via the second graphical user interface, user input associated with the first port;

generate a modified first port based at least in part on the user input; and store, in the data storage medium, the modified first port.

18. The system of claim 17, wherein the one or more computer hardware processors are configured to execute additional computer-executable instructions to at least:

generate an updated training data set based on the modified first port, wherein generating the updated training data set further includes at least:

adding a label associated with the modified first port to a training data set; and train a second machine learning model based on the updated training data set.

19. The system of claim 14, wherein determining the feature vector further includes at least:

determining a plurality of features based on a first net in the design file, wherein the plurality of features includes at least:

(i) a first feature for a name of the first net, (ii) a second feature based on the name of the first net, (iii) a third feature indicating a same type for the first net and a second net in the design file, (iv) a fourth feature for a connection between the first net and a first component or a first pin, and (v) a fifth feature based on a name of a pin connected to the first net.

* * * * *